(12) United States Patent
Bonanni et al.

(10) Patent No.: US 7,328,128 B2
(45) Date of Patent: Feb. 5, 2008

(54) METHOD, SYSTEM, AND COMPUTER PROGRAM PRODUCT FOR PERFORMING PROGNOSIS AND ASSET MANAGEMENT SERVICES

(75) Inventors: Pierino Gianni Bonanni, Clifton Park, NY (US); Kai Frank Goebel, Ballston Lake, NY (US); Neil Holger White Eklund, Schenectady, NY (US); Gary Paul Moscarino, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/359,339

(22) Filed: Feb. 22, 2006

(65) Prior Publication Data

US 2007/0198215 A1    Aug. 23, 2007

(51) Int. Cl.
*G06F 11/30*   (2006.01)
*G21C 17/00*   (2006.01)

(52) U.S. Cl. .................................... 702/182
(58) Field of Classification Search ........... 702/182
See application file for complete search history.

(56) References Cited

U.S. PATENT DOCUMENTS 5,210,704 A * 5/1993 Husseiny ............... 702/34

FOREIGN PATENT DOCUMENTS

WO         03042928      5/2003

OTHER PUBLICATIONS

Goebel et al., "Towards an Integrated Reasoner for Bearings Prognostics", 2005, IEEE, pp. 1-11.*
K. Goebel et al., "Towards an Integrated Reasoner for Bearings Prognostics," IEEE Aerospace Conference, Mar. 5-12, 2005, pp. 1-11. C.
Ten-Huei Guo et al., "Remaining Engine Life Estimation for a Sensor-Based Aircraft Engine," The International Conference on System, Man and Cybernetics, Oct. 2005, pp. 1-6.
GB Search Report, GB0625289, Mar. 21, 2007.

* cited by examiner

*Primary Examiner*—John Barlow
*Assistant Examiner*—Cindy Khuu
(74) *Attorney, Agent, or Firm*—Richard A. DeCristofaro; William E. Powell, III

(57) ABSTRACT

A method, system, and computer program product for performing prognosis and asset management services is provided. The method includes calculating an accumulated damage estimate for a component via a diagnostics function and applying future mission data for the component to at least one model that calculates accumulated damage or remaining life of the component. The method also includes inputting the accumulated damage estimate to the model and aggregating damage over time and quality assessments produced by the model. The method further includes calculating a damage propagation profile and remaining life estimate for the component based on the aggregating and providing an uncertainty estimate for the damage estimate and the remaining life estimate.

20 Claims, 13 Drawing Sheets

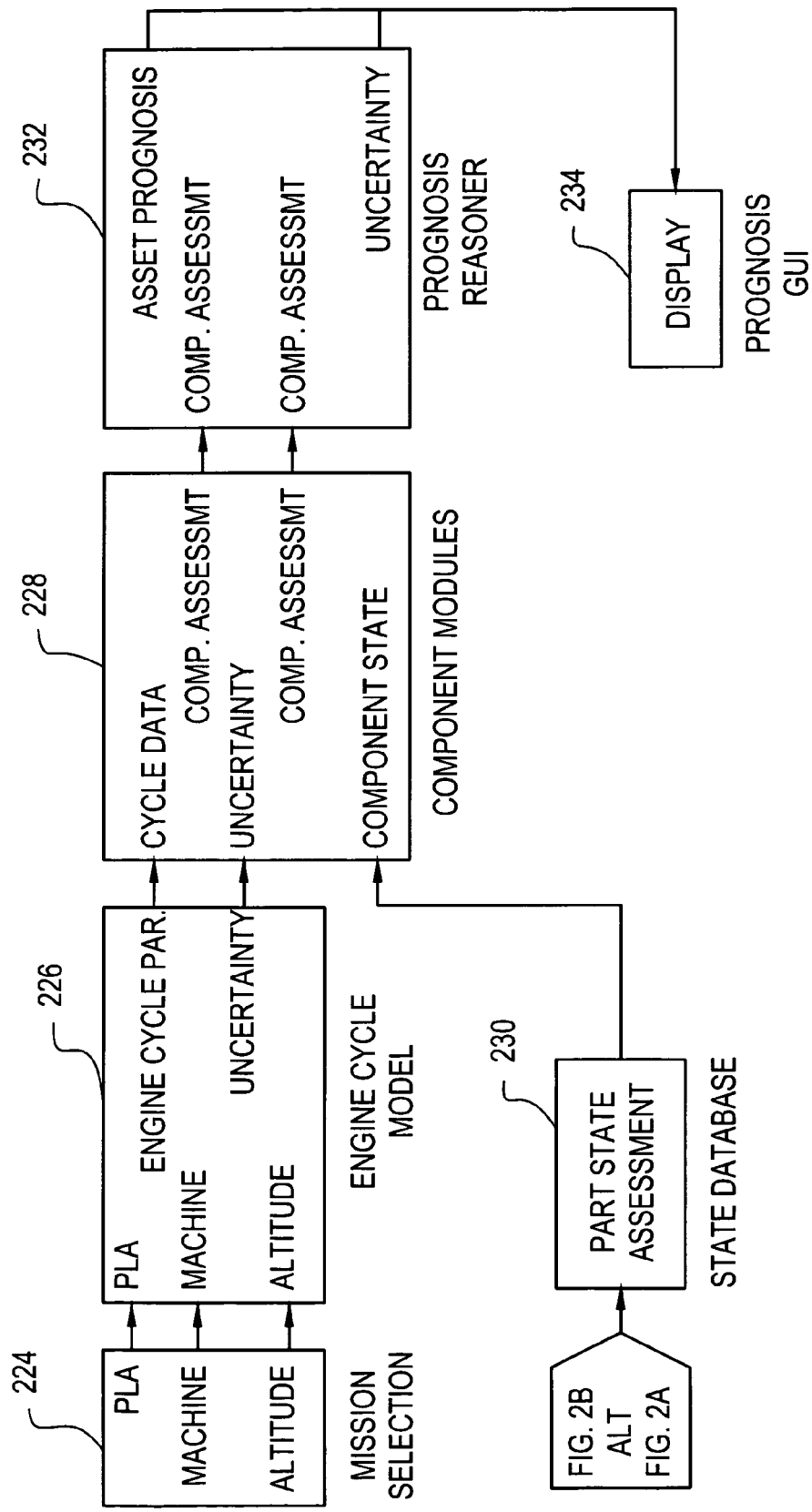

— $qa_{pb}$
--- $qa_{eb}$ hour at spall length = 7% of race

— EB prediction
o measured spall length

σ bounds

σ bounds

METHOD, SYSTEM, AND COMPUTER PROGRAM PRODUCT FOR PERFORMING PROGNOSIS AND ASSET MANAGEMENT SERVICES

STATEMENT REGARDING FEDERALLY SPONSORED RESEARCH AND DEVELOPMENT

The U.S. Government may have certain rights in this invention pursuant to contract number HR0011-04-C-0002 awarded by the Defense Advanced Research Projects Agency (DARPA) of the Department of Defense (DoD).

FIELD OF INVENTION

The present disclosure relates generally to the field of prognostics, and more particularly, to a method, system, and computer program product for providing prognosis and asset management services including system monitoring, diagnostics, and prognostics.

BACKGROUND

The field of prognostics, as applied to the operation of complex equipment, relates to a process for estimating the remaining life of a component. Remaining life estimates provide indispensable information for the operation of this equipment. They also provide decision-making aids that allow operators to change operational characteristics (e.g., load) which, in turn, may prolong the life of the component. In addition, they further allow planners to account for upcoming maintenance and set in motion a logistics process that supports a smooth transition from faulted equipment to fully functioning equipment. Examples of the types of equipment that are amenable to prognostics include aircraft engines (e.g., military and commercial), medical equipment, and power plants, to name a few. It also allows planner to optimize the use of their assets. Furthermore, this will help to guarantee mission success. Missions are here understood either as military missions or, in a civilian context, as operations involving the fulfillment of objectives involving equipment (such as aircraft).

Reasoners attempt to analyze a variety of information sources toward achieving a particular goal. In the case of complex equipment, e.g., one goal of the reasoner is to provide a remaining life estimate. To that end, it negotiates and aggregates data from independent information sources while taking their inherent uncertainty into account. The uncertainty may vary as a function of time, the priors on reliability of the information sources, and domain knowledge, among others. In addition, the reasoner needs to be ensured that the information that is being used provides the maximum information content. There are a number of issues that need to be dealt with prior to the actual aggregation. Specifically, the information needs to be checked for consistency, and it needs to be cleaned of outliers, noise, faulty or otherwise bad sensor information. It should also be conditioned and formatted to allow a proper comparison. These, and other considerations, must be taken into account by the reasoner.

By way of example, prognostics activities performed with respect to bearing components utilize sensor information that provides feedback on current damage levels. During operation, initially localized spall may grow and ultimately result in loss of function. Factors affecting damage initiation and damage propagation include changes in bearing loads, speeds, and environment. Lubrication, presence of material defects, surface degradation, and external contamination all factor into the bearing environment. Subsurface fatigue cracks are induced at locations of peak shear stress, become surface-connected, and lead to eventual liberation of material. Thus, one approach to bearing prognosis is to assess the micro-structural evolution, environmental embrittlement, cyclic hardening, and residual stress in order to calculate the propagation of bearing damage. The current state of the bearing, e.g., condition of health, may be determined by feeding direct sensor data and indirect parameters computed from sensor data into an ensemble of diagnostic algorithms as a basis for input to, e.g., fault-evolution and life models. The algorithms arrive at their conclusion either by direct measurement, models supported by measurements, or are simply triggered by measurements. The information sources that the reasoner relies on may be updated at different intervals during or between flights and may have different prediction horizons.

Ideally, features derived from sensor measurements would have monotonically changing properties that accurately reflect increasing component damage and be provided irrespective of external conditions. However, in practice this is nearly never the case: features reflect the noise inherent in sensed data and react differently during particular stages of damage evolution (e.g., some are useful for fault detection, but not for damage growth tracking).

Oil debris monitor features, such as particle counts, have excellent tracking properties that are robust to changes of environmental parameters. However, they may be not as suitable to identification of fault initiation because their resolution is too low for detection of small damage levels. In addition, absolute counts can be misleading when material gets trapped over time and due to external contamination. Better sensors for fault initiation and initial fault growth tracking may be vibration sensors that have the promise to pick up smaller damage levels. Features from various transforms such as Fourier, Hilbert, and wavelets can be useful in detecting and categorizing incipient faults. However, the vibration sensor's capacity for early detection comes at the price of sensitivity to environmental effects that are sometimes difficult to quantify or correct. For example, in an aircraft engine (and in particular, one that is under conditions of military use), these changes can be significant. Thus, it may be expedient to aggregate vibration and oil debris information to take advantage of the benefits of both. The fusion of information from oil debris and vibration sources, along with knowledge about system and machinery history can result in interactions that may improve the confidence about system condition.

The field of prognostics is reliant on diagnostics to provide a trigger point for the prognostic algorithms. That is, no prognostic estimates are calculated before diagnostics has detected a fault condition. In the absence of abnormal conditions, or fault conditions, the best estimates for remaining component life are often fleet wide statistics expressed by Weibull curves or other suitable mechanism. Condition-based systems depend on reliable fault diagnostics to initiate the prognostic algorithms. It is therefore important to optimize the diagnostic capability to attain optimal prognostics. If diagnostics recognizes the start point of damage too late, the damage propagation models will always lag reality and keep underestimating the damage. If prognostic algorithms are initiated when there is no real damage, the benefit of true remaining life estimate is erased.

The remaining useful life (RUL) estimates are typically in units of time until the likelihood of failure reaches a particular threshold. RUL is often estimated indirectly via the calculation of a metric that, when exceeding a particular threshold, indicates imminent component failure. In the context of bearing race spall, this metric could be spall length. When spall length surpasses a critical value, damage accumulates rapidly; bearing cage failure occurs soon after this threshold has been exceeded.

The utility of future estimates is in direct proportion to the amount of associated uncertainty. That is, if an estimate has very large confidence bounds, the utility of such an estimate becomes very small because an operator would have to make decisions to repair components at an otherwise acceptable level of risk. A key contribution of the reasoner is to assess the uncertainty of the individual estimators and to aggregate them such that the uncertainty bounds of the resulting output are smaller than any of the individual information sources alone. Moreover, the output of the reasoner is more accurate than any individual information source alone.

Several fundamentally different approaches may be employed to estimate future damage. One is to model from first principles the physics of the system as well as the fault propagation for given load and speed conditions. Such a model must include detailed knowledge of material properties, thermodynamic behavior, etc. Alternatively, an empirical (also referred to as experience-based) model can be employed wherein data from experiments at known conditions and component damage level are used to build a model for fault propagation rate. Such a model relies heavily on a reasonably large set of experiments that sufficiently explores the operating space.

The two approaches mentioned for estimating future damage have various advantages and disadvantages. The physics-based model relies on the assumption that the fault mode modeled using the specific geometry, material properties, temperature, load, and speed conditions will be similar to the actual fault mode. Deviation in any of those parameters will likely result in an error that is amplified over time. In contrast, the experience-based model assumes that the data available sufficiently maps the space and that interpolations (and small extrapolations) from that map can accurately estimate the fault rate.

What is needed, therefore, is a way to provide real-time (or near real-time) information concerning existing and future asset health that is more accurate and reliable than existing processes.

BRIEF SUMMARY

In accordance with exemplary embodiments, a method, system, and computer program product for performing prognosis and asset management services is provided. The method includes calculating an accumulated damage estimate for a component via a diagnostics function and applying future mission data for the component to at least one model that calculates accumulated damage or remaining life of the component. The method also includes inputting the accumulated damage estimate to the model and aggregating damage over time and quality assessments produced by the model. The method further includes calculating a damage propagation profile and remaining life estimate for the component based on the aggregating and providing an uncertainty estimate for the damage estimate and the remaining life estimate.

The method includes calculating an accumulated damage estimate for a component via a diagnostics function and applying future expected use data for the component to a physics-based model and an experience-based model. The method includes aggregating damage estimates over time and incorporating quality assessments produced by each of the future damage estimation models. Based upon the aggregation, the method calculates a damage propagation profile with associated uncertainty distribution and remaining life estimate for the component.

BRIEF DESCRIPTION OF THE DRAWINGS

Referring to the exemplary drawings wherein like elements are numbered alike in the accompanying FIGURES:

FIG. 2C illustrates a detailed representation of a prognosis subsystem of the system architecture depicted in FIG. 1 in exemplary embodiments;

DETAILED DESCRIPTION OF THE EXEMPLARY EMBODIMENTS

Figure 1:
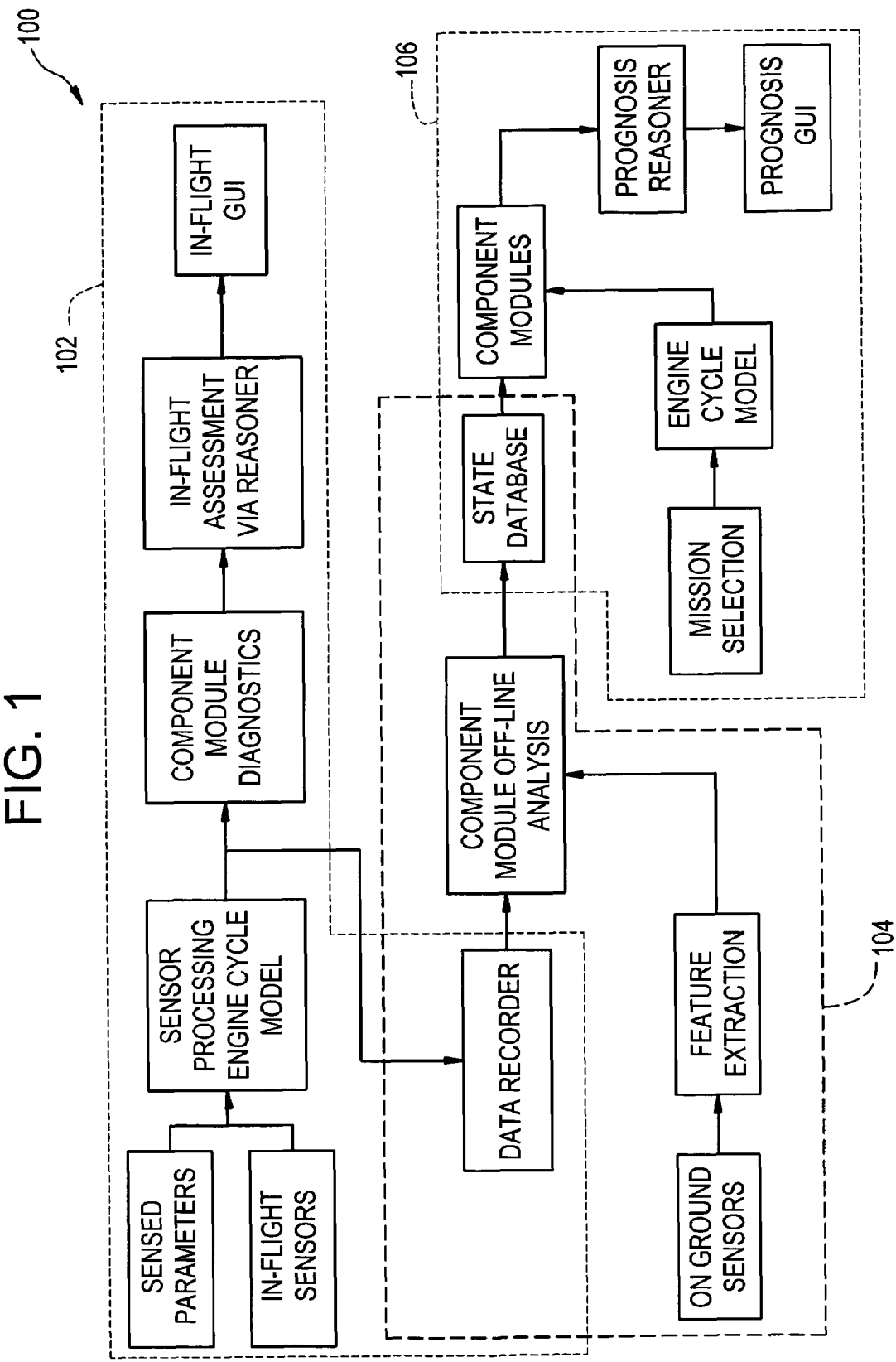
FIG. 1 depicts a system architecture including three subsystems for performing the asset management services in exemplary embodiments.

Turning to FIG. 1, a system architecture 100 for performing prognosis and asset management services including system monitoring, diagnostics, and prognostics for managing system health of an engine (e.g., aircraft engine) will now be described. System 100 includes three subsystems 102-106 as shown in FIG. 1, and are collectively referred to as an integrated prognosis system. Subsystem 102 performs in-flight diagnostics. Subsystem 102 generates component diagnostics and material state assessments in real-time and during flight, using available online sensor data. Subsystem 104 performs post-flight analysis using, in part, information resulting from in-flight diagnostics performed by subsystem 102, as well as other sources. The post-flight analysis activities of subsystem 104 enable more accurate estimates of remaining life of components, and reduce the variance of these estimates. This may be accomplished by including data from additional sources, e.g., ground based inspections and by employing more detailed models and tools than those that are possible in the in-flight setting. Subsystem 106 performs prognostics using information received from subsystems 102 and 104, as well as other information. Prognosis subsystem 106 uses prospective mission profiles and utilizes models to generate a prognosis, and corresponding uncertainty, of the asset, or component, into the future. These subsystems are described in further detail in FIGS. 2A-2C.

In alternative exemplary embodiments, subsystem 106 performs prognostics using information received solely from subsystem 102 (i.e., in-flight diagnostics and performance assessments) whereby prognostics are performed from a continuously updated asset state. This feature is described further herein.

Figure 2A:
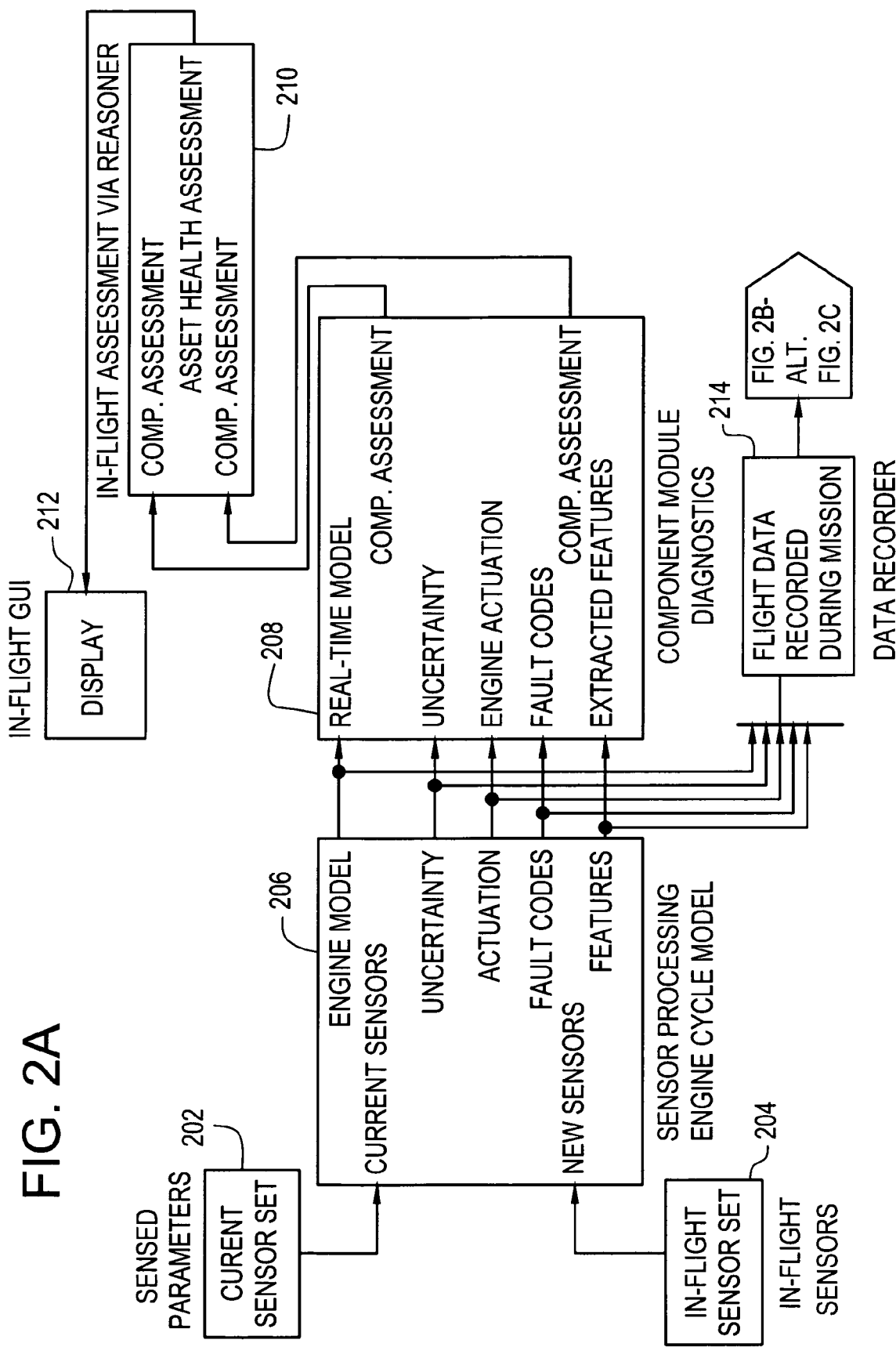
FIG. 2A illustrates a detailed representation of an in-flight diagnostic subsystem of the system architecture depicted in FIG. 1 in exemplary embodiments.

Turning to FIG. 2A, the in-flight diagnostic subsystem 102 will now be described in exemplary embodiments. Subsystem 102 uses sensed parameters for engine control and fault diagnosis. A current sensor set 202 may be one source of sensor information (e.g., current suite of engine and airframe sensors used for engine control and fault diagnosis). The current sensor set 202 is inputted to a sensor processing engine cycle model 206. Another source of information may be a collection of material state-specific sensors (e.g., those used for material state awareness), referred to here as in-flight sensor set 204. As shown in FIG. 2A, the in-flight sensor set 204 is inputted to the sensor processing engine cycle model 206. Other types of in-flight sensor information 204 may include clearance probe data which delivers real time measurements of average and blade-specific clearances. The sensor information inputted to the sensor processing engine cycle model 206 is processed therein to determine actuation for the engine and to detect fault codes. In addition, the sensor processing engine cycle model 206 tracks the engine and delivers estimates of unmeasured engine variables. Further, the engine cycle information permits interpretation of the sensor data, to extract material state awareness features.

The results of the processing performed by the sensor processing engine cycle model 206 are aggregated to a diagnostics bus, which is then made available to all component diagnostic modules. As shown in FIG. 2A, a component module diagnostics engine 208 computes real time assessments at the component level. If meaningful, the assessment may take the form of an updated life consumption estimate (e.g., where the component assessment performed by engine 208 is a fan/compressor airfoil assessment due to the high-cycle fatigue common in fan and compressor sections). The assessment may also include fault diagnostic information (e.g., alerting users to detected faults).

The component-level assessments produced via engine 208 are supplied to an asset-level reasoner 210. The asset-level reasoner 210 aggregates the assessments and delivers a single assessment for the asset (e.g., via an in-flight display 212). The diagnostic data generated during the flight are also dispatched to a data recorder 214 which can be played back to permit a more detailed and comprehensive post-flight analysis (described in FIG. 2B).

Figure 2B:
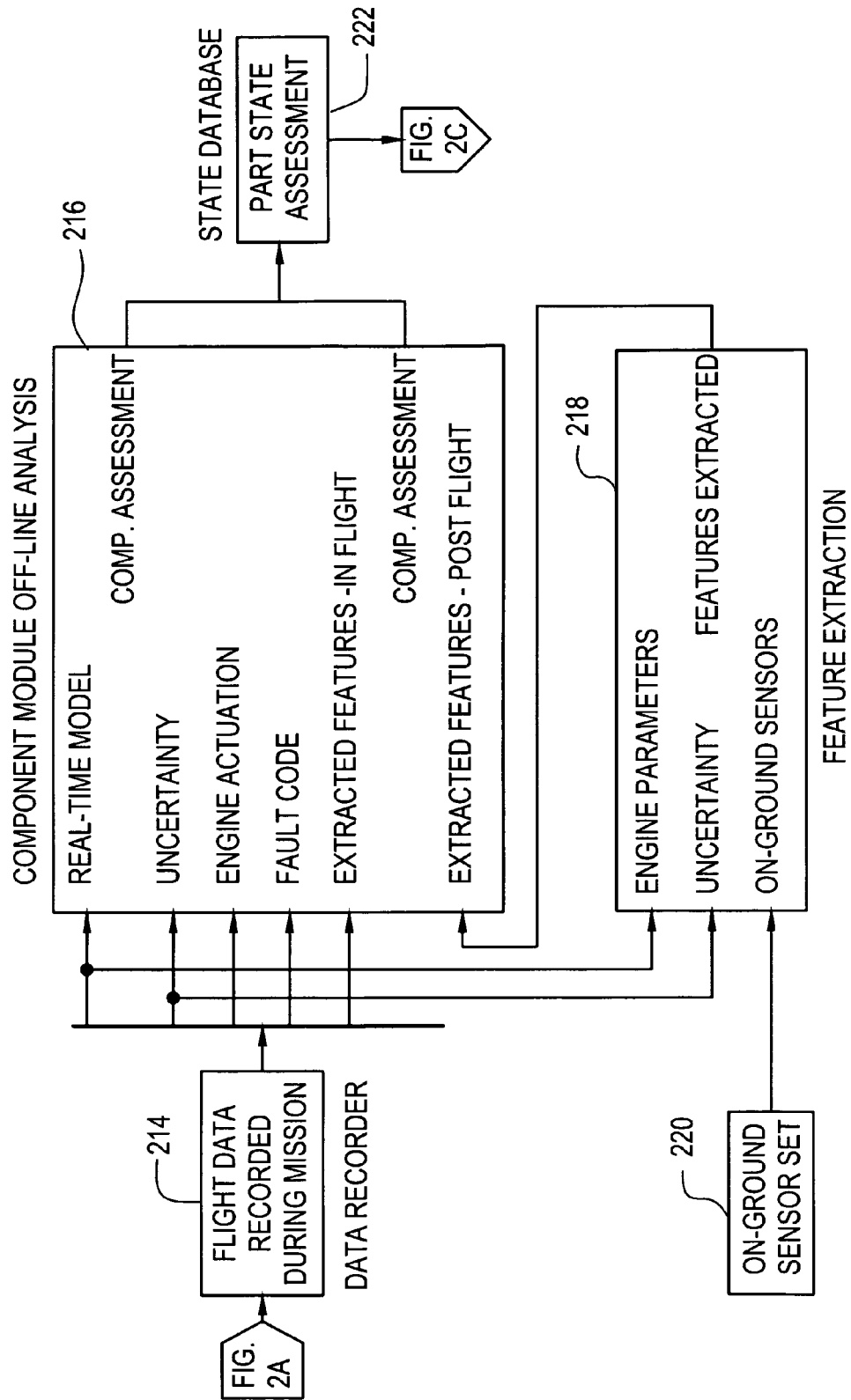
FIG. 2B illustrates a detailed representation of a post-mission analysis subsystem of the system architecture depicted in FIG. 1 in exemplary embodiments.

Turning to FIG. 2B, the post-mission analysis subsystem 104 will now be described in exemplary embodiments. The in-flight data stored in data recorder 214 (i.e., diagnostic data comprising mission data, engine sensor and actuator data, fault codes, as well as data from in-flight material-state sensors) are inputted to a component module off-line analysis engine 216. In addition, other sources of information from ground-based sensors 220 may be made available to the engine 216 (e.g., off-line measurements of damage state or material surface properties). Sensor information from ground-based sensors 220 is extracted (feature extraction) using any elements of the recorded flight history via feature extraction process 218. The extracted features from ground-based sensors 220 are combined with diagnostic information available from the data recorder 214 and are used as input to off-line component loading and lifting algorithms, tools, and processes, for performing a detailed health state assessment via engine 216. Because of real time requirements, lack of data, and limitations on computational power, in-flight estimates of consumed life are relatively inaccurate and imprecise. By using sensor sources and high-fidelity lifting tools, the post-mission analysis is more accurate and precise.

For example, assume that the component assessment is for a hot gas path module, the data recorded in-flight enables computation of temperature and stress loading at critical locations. The loading is, in turn, analyzed and a low-cycle fatigue (or LCF) remaining life estimate is computed. In a second example, the same mission and engine information is evaluated, but this time an estimate of maximum metal temperature made possible by an in-situ temperature sensor. This information highlights a single blade at elevated temperature, whose localized contribution is not significantly reflected in the engine cycle data. Temperature and stress loading for this life-limiting location is computed and analyzed, and a more accurate LCF estimate results. A comparison of the two examples may indicate a substantially different estimate of remaining life.

The post-mission analysis is completed with the component health assessments being recorded to a tracking database (also referred to as state database) 222, where they are subsequently made available for prognostic assessments based upon future mission profiles. The process proceeds to subsystem 106 as described in FIG. 2C.

Turning to FIG. 2C, the prognosis subsystem 106 will now be described in exemplary embodiments. One or more missions (224) is selected based upon, e.g., an ensemble of Power Level Angles (PLAs), Mach number, and altitude. These may be drawn from a catalog of actual past missions or constructed based upon an expected future mission requirement. Missions may be, e.g., comparatively intense, potentially causing a high degree of accumulated damage, or alternatively, relatively low damage, or any level in between. The mission information is inputted to an engine cycle model 226, which has been tuned to high accuracy through in-flight tracking of the actual engine. The engine cycle model 226 is then employed to estimate engine cycle parameters for each of the chosen missions.

The current state of the asset is taken from the state database 230 having been updated either in-flight (via FIG. 2A) or through a more recent post-mission analysis (via FIG. 2B). The cycle data and the current asset data are used as inputs to high-fidelity lifting models (i.e., component modules) 228 to develop assessments of the state of the asset after completing the ensemble of missions. Using the above example of hot gas path, the mission information, PLA, machine, and altitude sequences describing one possible mission type are utilized. From these are computed corresponding engine cycle variables, and in turn, temperature and stress loading at critical locations for the turbine airfoils. The loading is then analyzed and a low-cycle fatigue (LCF) estimate is computed indicating the corresponding life consumption permission via component modules 228.

In a second example, the process is repeated considering an alternate mission type. Through the engine model, cycle parameters are computed. From these, revised component loading sequences are computed, and in turn, a new LCF estimate corresponding to a different life consumption per mission results. A comparison of the two results may indicate a dramatic effect of mission type on the life consumption.

In the final analysis, the individual component health assessments are combined via a prognosis reasoner 232 to produce an assessment for the overall asset, and the associated uncertainty. The results may be provided to a display 234 for review. Disposition of the asset can then be decided, and risks assessed.

As indicated above, the integrated prognosis system may be utilized in a variety of applications. In exemplary embodiments, application of the integrated prognosis system for bearing components will be described herein. The integrated prognosis system includes a fusion method, which incorporates a number of different measures that inform about the reliability of the future damage estimate, their expected accuracy, and various other uncertainty measures. These measures in turn may be a function of different variables such as time, where in the load/speed space the estimate is performed, known shortcomings or strength in some areas of that space, etc.

The fused prognostic estimate can be calculated by using both a physics-based as well as a data-driven approach. The individual approaches can have a plurality of input sources such as component properties (e.g., material properties and usage properties), history of the component (current damage state and history of accumulated usage), future anticipated usage, damage propagation rates established during experiments, etc. Damage estimates are arrived at using sensor information such as oil debris monitoring data as well as vibration data. The fusion method detects the onset of damage and triggers the prognostic estimator that projects the remaining life.

Uncertainty, stemming from the variability observed during experiments, as well as modeling inaccuracies, material variability, and other factors are propagated to provide a distribution around the projected remaining life. It is desirable to keep the uncertainty interval as accurate as possible. In exemplary embodiments, the fusion method fuses competing prediction algorithms for prognostics. Results presented may be derived from rig test data wherein multiple bearings are first seeded with small defects, then exposed to a variety of speed and load conditions similar to those encountered in aircraft engines, and run until the ensuing spall increases to a predetermined damage threshold or cage failure, whichever occurs first.

Figure 3:
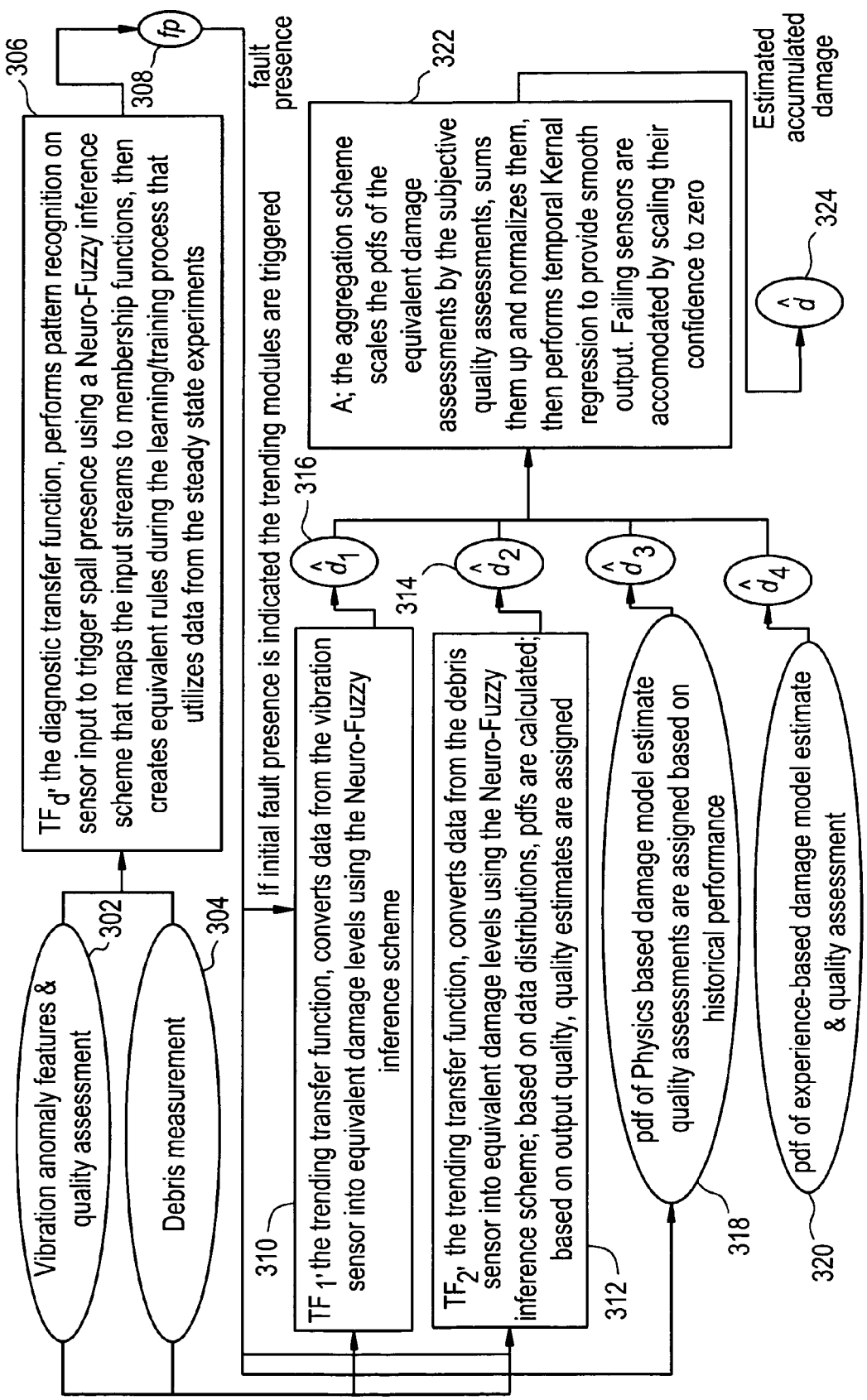
FIG. 3 is a flow diagram describing diagnostic functions of a prognostic reasoner in exemplary embodiments.

Turning to FIG. 3, the diagnostic mode process will now be described in exemplary embodiments. Using an in-mission setting for the in-flight and post-flight diagnostic modes, features derived from vibration measurements 302 and debris counts 304 are used in transfer functions 306 to provide a damage detection indicator 308. In an exemplary embodiment, an adaptive neuro-fuzzy inference scheme (ANFIS) is used that takes these information sources as input and gives fault presence likelihood p as output:

$$p = f(\text{features}_{debris}, \text{features}_{vibration})$$

where
f=neuro-fuzzy inference system.

Any other suitable mapping function may be employed here as well, such as neural nets, support vector machines, random forests, etc. The detection algorithm is tuned to avoid false positives and to minimize late detection. If the output of the fault presence exceeds a fault detection threshold, the fault is declared present.

Next (and only after the fault has been detected), a suite of transfer functions 310, 312 converts sensor-based features into equivalent damages $\hat{d}_{debris}, \hat{d}_{vibration}$, 316, 314 for vibration-based damage estimates and debris-based damage estimates, respectively. It will be appreciated that any suitable mapping function may be employed. For purposes of illustration, ANFIS is utilized as the mapping function:

$$\hat{d}_i = f(\text{features}_i)$$

where
i is either the debris information or the vibration information.

Additional damage estimates come from a physics-based tool 318, as well as an experience-based tool 320 (described in more detail below). In parallel, quality estimates are provided for each estimate. The quality estimate is an assessment of the goodness of the output and is described further herein.

Next, an aggregator 322 combines the information, trading off the quality estimates and fusing the probably density functions (PDFs), resulting in an estimate of accumulated damage 324.

Figure 4:
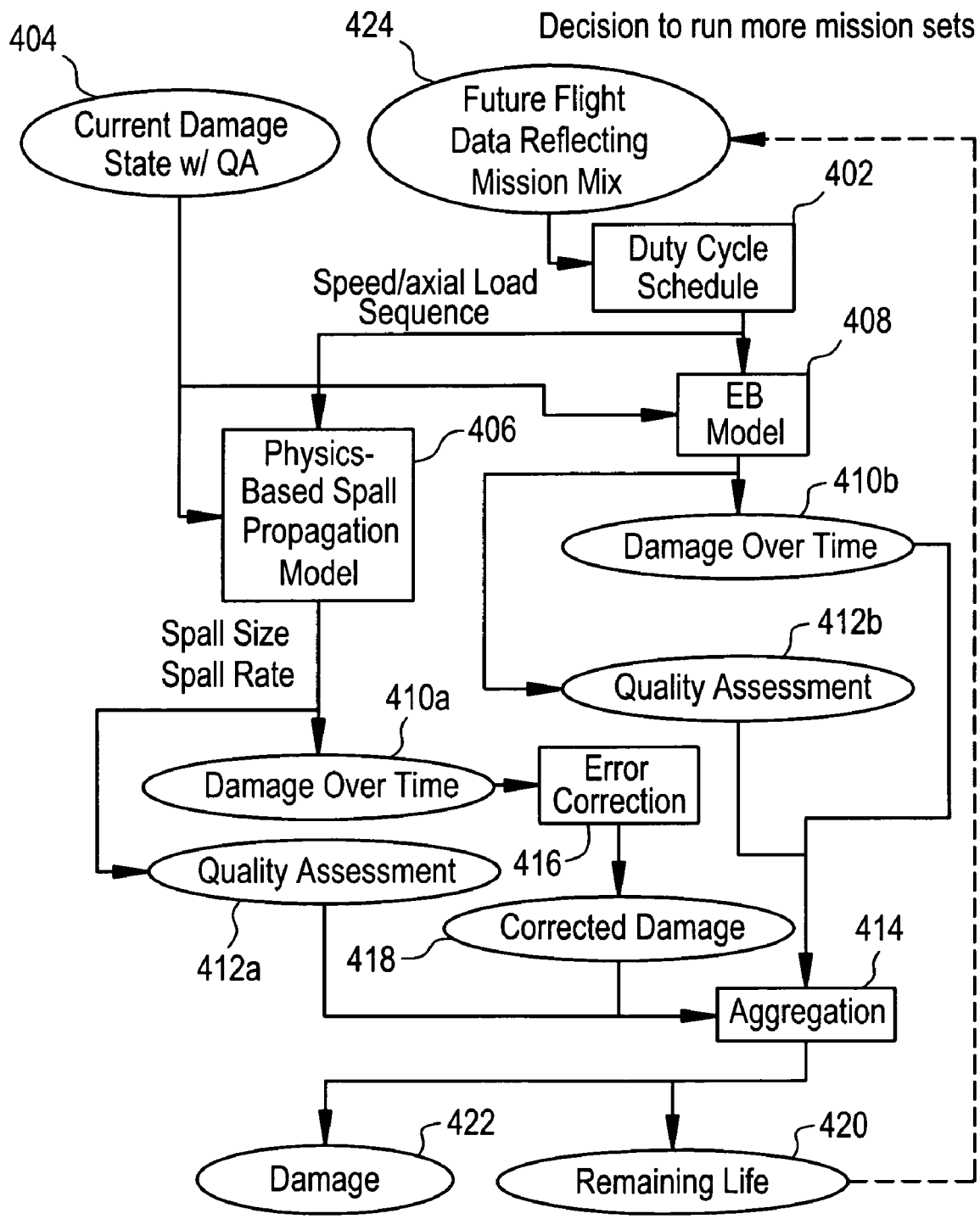
FIG. 4 is a diagram illustrating the operational features of the prognostic reasoner in exemplary embodiments.

As indicated above, the integrated prognosis system operates in two fundamentally different modes, diagnostic and prognostic. Turing to FIG. 4, the prognostic mode will now be described with respect to a prognostic reasoner 400. Prognostic models may be run either on-board or on-ground, depending on whether there is a need for short-term outlook (in which case the prognostic reasoner 400 would be executed on-board) or whether there is a need for a longer-term outlook (in which case it makes more sense to run the prognostic reasoner on-ground). If a fault has been detected, the prognostic functions are executed on a set of future missions. Specifically, missions 402 characterized in part by sequences of load, speed, and ambient conditions are used as input to one or more models (e.g., the physics-based spall propagation model 406 as well as the experience-based model 408). In conjunction with the current damage state 404, the output of the spall propagation model 406 will provide a damage propagation profile 422 into the future.

The modeled damage over time 410*a-b* and the quality assessment over time 412*a-b* from each model 406, 408, respectively, are then forwarded to the aggregation module 414. In addition to supervising the execution of the modules 406, 408, the prognostic reasoner 400 makes corrections 416, 418 where desired, as described further herein. The aggregator 414 then aggregates the different estimates, or outputs 410*a-b* and 412*a-b*. There are different ways in which the prognostic reasoner 400 may operate based on user demand. In one embodiment, the prognostic reasoner 400 reports both the profile of remaining life 420 and information on whether the envisioned missions can be completed without exceeding the acceptable damage limit. In another embodiment, the prognostic reasoner 400 provides information back to the mission generation process 424 to prompt for additional mission runs when damage limits have not been reached. The goal of executing the damage propagation model with additional runs is to determine the damage propagation profile 422 and to find the remaining life limit (i.e., profile of remaining life 420).

As mentioned above, if no fault has been detected, the prognostic reasoner 400 is bypassed and is replaced by fleet statistics that are compiled on bearing fatigue data.

In accordance with exemplary embodiments, the various features and functions of the integrated prognosis system will now be described in further detail. As indicated above, the integrated prognosis system comprises a multi-layer architecture that includes pre-processing, analysis and post-processing steps, each of which are partitioned into modules. The pre-processing steps will now be described in exemplary embodiments.

Pre-processing comprises those steps taken to assemble, repair, and synchronize the sensor feature data prior to applying any inference or fusion steps.

In an ideal setting, one might choose to conduct life trials by running a test rig continuously from initiation of damage to final failure of the component. However, the need to collect ground truth data, as in the case of the size of spall on the bearing race, periodic shutdown and detailed inspection of the rig is typically required. Further, some tests may require full attendance by an operator to ensure safe operation and, in some cases, to manually cycle the test conditions. As a result, the assembled test data consist of segments of contiguous active operation, of typically several hours in length, oftentimes separated by extended idle periods.

Complicating this fact is that the various sensor systems employed on the rig may be run on independent systems with different sampling rates. In the case of the oil debris sensor, e.g., measurements are triggered asynchronously by detection of particles, rather than on a regular time interval. The startup and shutdown of these sensor systems are usually accomplished manually, resulting in some data collection even when the rig is not rotating.

Figure 5:
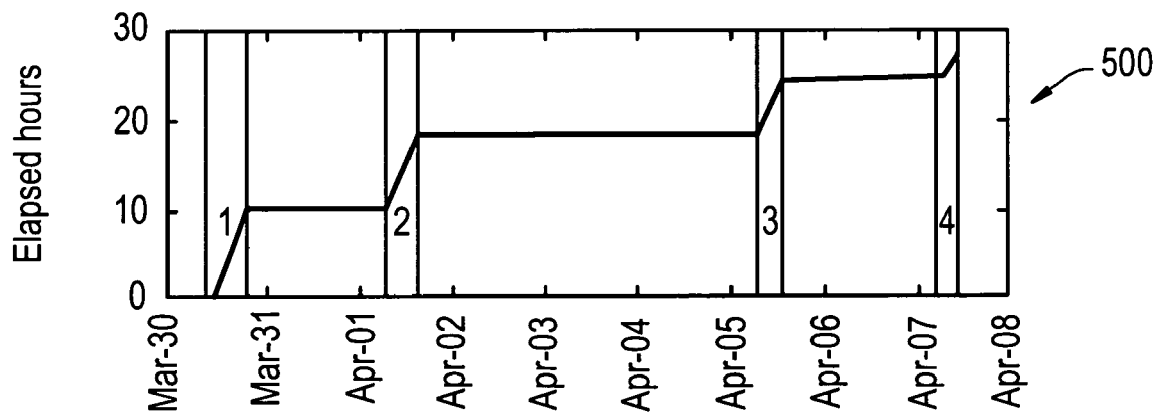
FIG. 5 is a graphical depiction of a time mapping function of the prognostic reasoner in exemplary embodiments.

The first pre-processing step, therefore, involves assembling contiguous data sequences that represent only the active operation of the rig, with time expressed in elapsed runtime hours from the start of the test. This may be accomplished by creating a time mapping function, a sample of which is shown in FIG. 5. The x-axis of the time mapping function 500 of FIG. 5 represents actual date and time of data collection and the y-axis gives elapsed test hours. The curve has non-zero slope during active operation and zero slope during idle.

The start and stop of active operation may be determined by applying a small threshold to the speed signal.

Figure 6:
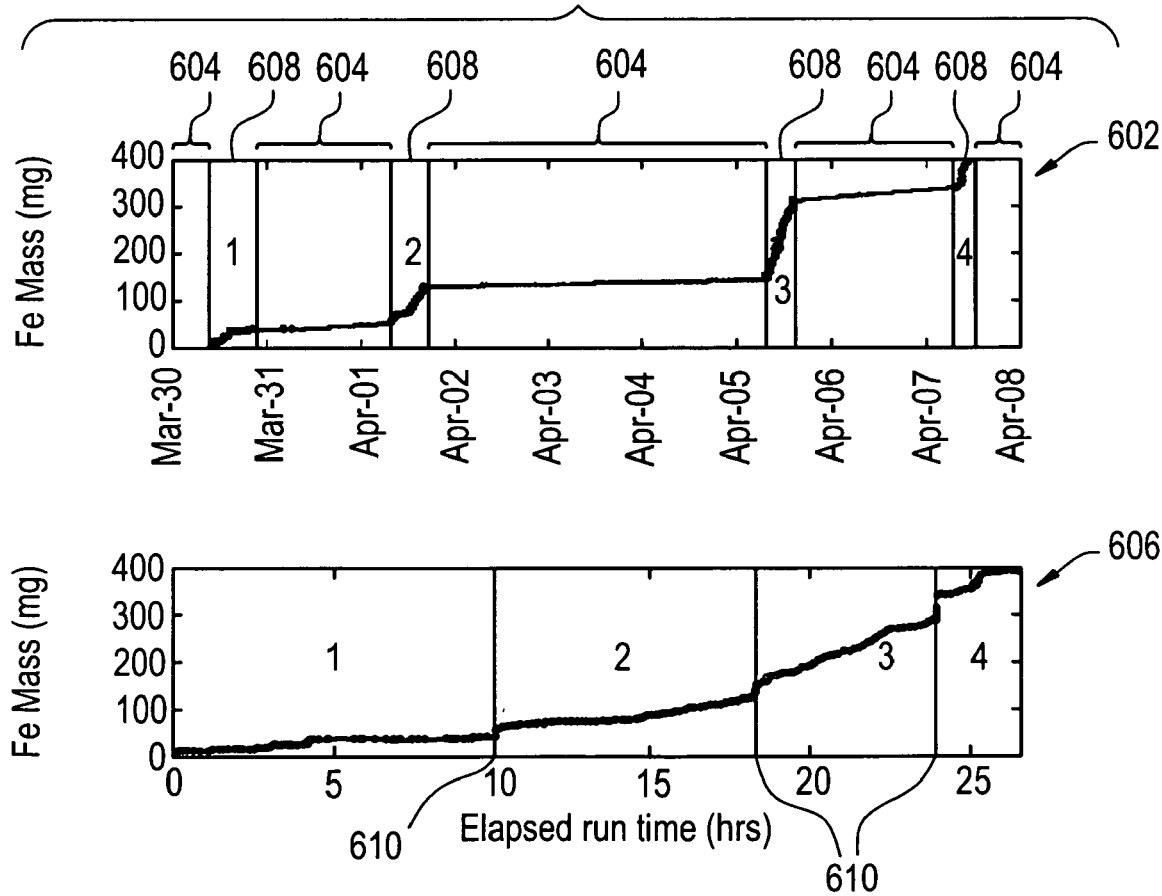
FIG. 6 is a graphical depiction of a sequence assembly using the time mapping function in exemplary embodiments.

Applying this time-mapping function to a typical time-stamped sensor data sequence provides a result as shown in FIG. 6. The upper plot 602 represents data versus absolute time, with idle periods 604. The lower plot 606 shows the same sequence plotted versus elapsed runtime hours. The regions 608 of the upper plot 602 correspond to the vertical lines 610 of the lower plot 606.

By this method, depending on the timing of the startup and shutdown of the specific sensor, a series of successive data points falling within an idle period will get mapped to exactly the same elapsed time value. These are aggregated to a single value by taking a simple average of the points.

Several of the employed sensors measure cumulative parameters, such as liberated particle counts or total liberated mass, which can only increase as the bearing degrades. On these signals, a second preprocessing step is therefore warranted for removal of software resets and other negative trending outliers. This step follows the rule:

$$x(k) = \begin{cases} x(k) \text{ for } x(k) \geq x(k-1) \\ x(k-1) + x(k) \text{ for } 0 < x(k) < x(k-1) \\ x(k-1) \text{ for } x(k) \leq 0 \end{cases}$$

That is, if a zero or negative value is encountered, the negative transition is removed and continuity is preserved. However, if the transition is to a lower but still positive value, that value is applied cumulatively to the previous value. The first of these corrections is directed at software resets and the possibility of electromagnetic interference induced artifacts in the measurements. The second correction addresses the possibility that a reset may have occurred and more debris liberated prior to collection of the next measurement.

A third pre-processing step entails synchronizing all relevant sensor features to a common, uniformly sampled time vector. This may be accomplished by a straightforward linear interpolation of available measurements between the times associated with those measurements.

As indicated above, in addition to the damage estimate, each model (e.g., 406, 408) is assigned a quality assessment that can be interpreted as a measure of model confidence. These confidences may be computed based on a priori performance of the models. That is, the models may be known to have a different performance within different regions of the load-speed mission space. Additionally, the models 406, 408 may be known to produce biases at different damage levels or at different damage rate levels. Moreover, the further out into the future the prediction is being made, the less likely it is to be correct. While statistical confidence intervals assess the model variability, the quality assessment is intended to assess other sources of uncertainty.

Figure 7A:
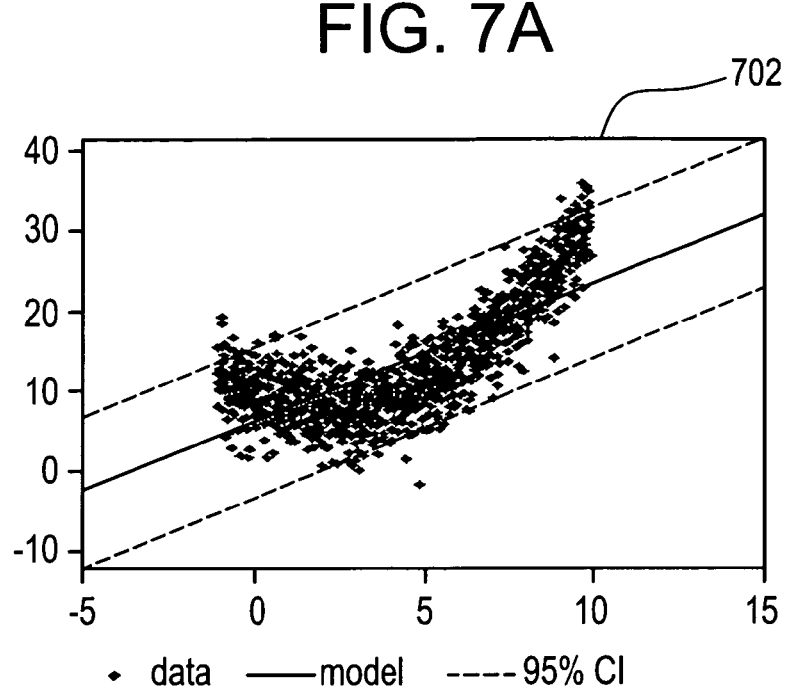
FIGS. 7A-7C are graphical depictions of quality assessments produced via the prognostic reasoner in exemplary embodiments.
Figure 7B:
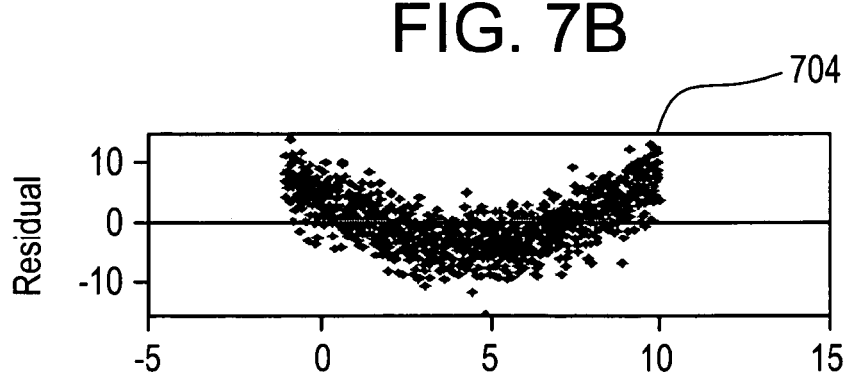
Figure 7C:
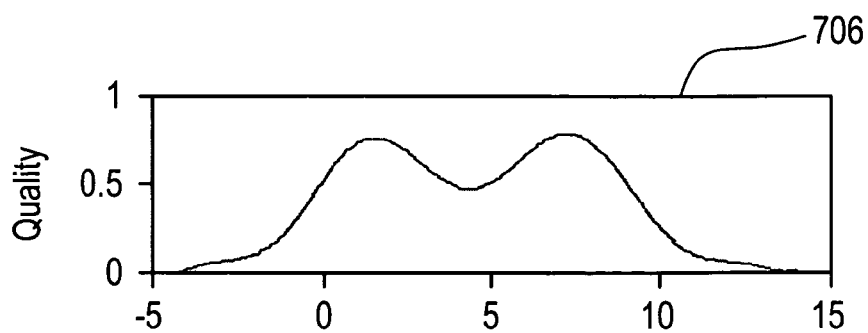

For example, the top set of axes 702 shown in FIG. 7 shows some data fit with a linear model. The dashed lines show the 95% confidence interval of the model. However, as one can readily see from a second set of axes 704 shown in FIG. 7B, a linear fit is a poor approximation of the data (this would be less obvious in, e.g., a space of higher dimensionality). If this model was, for example, driven by first principles to this particular form, the confidence interval of the model alone does capture the entire characteristic of the data. However, if one takes into account the quality of the model (e.g., derived by examining the performance of the model) for particular regions of the search space (or other factors, e.g., time), one has the possibility to exploit this additional information during the aggregation step which ultimately may result in better performance of the prognostics. A third set of axes 706 shown in FIG. 7C illustrates this concept.

In particular, the quality assessments $qa_{debris}$ are calculated differently for different information sources. For the debris sensor information $m_{debris}$, the quality assessment is essentially a function of the variability over the past n readings (as expressed by a window) bounded between two limiting values, a lower confidence $bound_{lower}$ and an upper confidence $bound_{upper}$ as long as the damage is below a certain threshold $th_{damage}$. Above that threshold, the quality assessment is gated to a fixed value $qa_{critical}$. For values below the threshold damage, this philosophy reflects the belief that consistent values should be believed more than values that fluctuate excessively. It is a built-in advisory that will discount values that are non-monotonic or that contain outliers. It also addresses in part the variations that are observed shortly after inspections. If the debris is above a set threshold, the confidence is assigned its full upper value, reflecting a need to incorporate all measurements as the damage becomes more critical. The governing equation is:

$$qa_{debris} = \begin{cases} \max(bound_{lower}, \min(bound_{upper}, 1 - std(m_{debris}(window)))) \\ \quad \text{for } m_{debris} \leq th_{damage} \\ qa_{critical} \quad \text{for } m_{debris} > th_{damage} \end{cases}$$

Typical values for the threshold and fixed values are:
$bound_{lower}=0.1$
$bound_{upper}=0.8$
$qa_{critical}=0.6$
size of window=50

Figure 8:
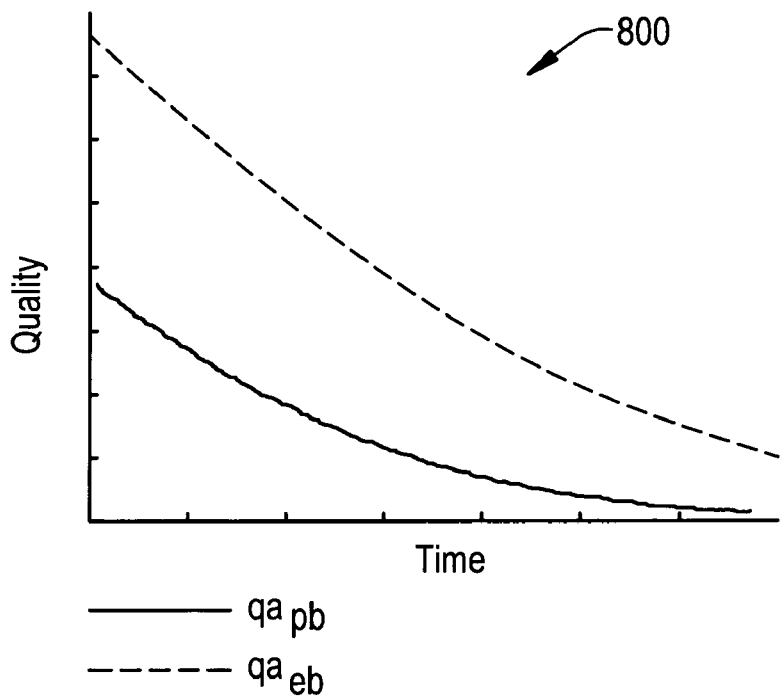
FIG. 8 is a graphical depiction of a subjective quality assessment/confidence for competing estimates in exemplary embodiments.

The quality assessment for the physics-based assessments $qa_{pb}$ is a function of time passed since initiation of the model. It is bounded by a lower value $bound_{lower}$ and the prior at time of model initiation $t_0$. The governing equation is $$qa_{pb}(t)=\max(bound_{lower}, qa_{pb}(t(k-1))\cdot(1-scaler_{slope}\cdot(t-t_0)))$$

where typical values are, for example,
$bound_{lower}=0.1$
$scaler_{slope}=0.0001$ In the forward mode, the quality assessment for both the physics-based model and experience-based model are based on time. As shown in graph 800 of FIG. 8, subjective quality assessments (also sometimes referred to as "confidences") are assigned to the estimators in the forward mode.

Because there is no direct measurement of the load, the uncertainty of the estimate needs to be modeled. Specifically, the uncertainty is modeled as an 8.3% standard deviation ($3\sigma=\pm25\%$), normally distributed, zero mean error between engines. That is, for a given engine, the error of the load estimate was assumed to be constant. The governing equation is:

$$load=load_{estimate}+error_{uncertainty}$$

where $$error_{uncertainty}=load\cdot randNormal(\bar{x}=0, \sigma=0.0833)$$

Figure 9:
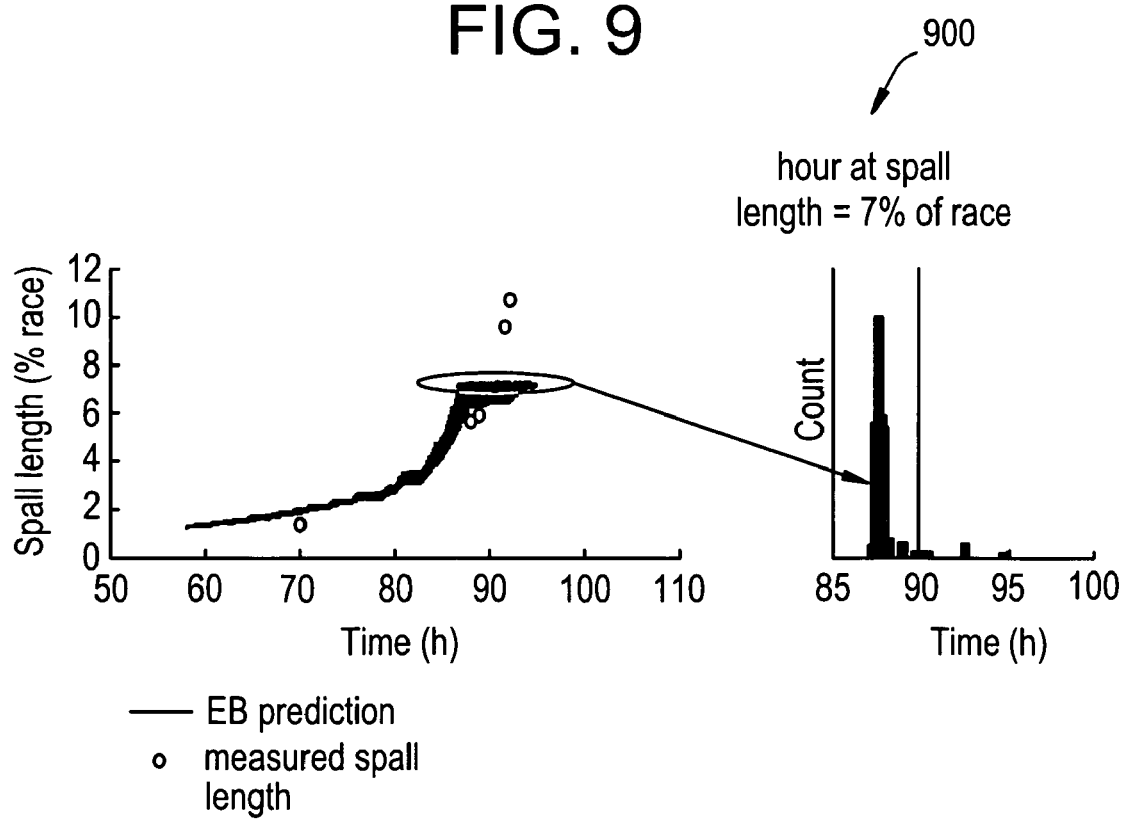
FIG. 9 is a graph illustrating effects of load uncertainty on an experience-based model in exemplary embodiments.

Load uncertainty is imposed on both the experience-based model as well as the physics-based model. As shown in FIG. 9, a graph 900 illustrates the effect of the load uncertainty on the experience-based model, here demonstrated by showing the range of the spall length (% race) over time (h) when running the load model many times.

In addition to load uncertainty, an additional amount of normally distributed random uncertainty with mean zero and a fixed standard deviation (0.03 inches) is added to the output of the experience-based model.

As indicated above, two models are fused in the prognostic reasoner, a physics-based (PB) model and an experience-based (EB) model. Returning to FIG. 4, the experienced-based model 408 will now be described in exemplary embodiments. For purposes of illustration, an experience-based model reflecting an empirical fit of data from seven experiments at five points in the speed and load space is described and graphically depicted in FIG. 10. Spall length is calculated as:

$$l_{spall} = 10^{\log10(l_{spall_{t=0}})} + \sum_{t=0 dr current} rate(t)*dt$$

where $rate = 10^{f(speed(t), load(t))}$.

Figure 10:
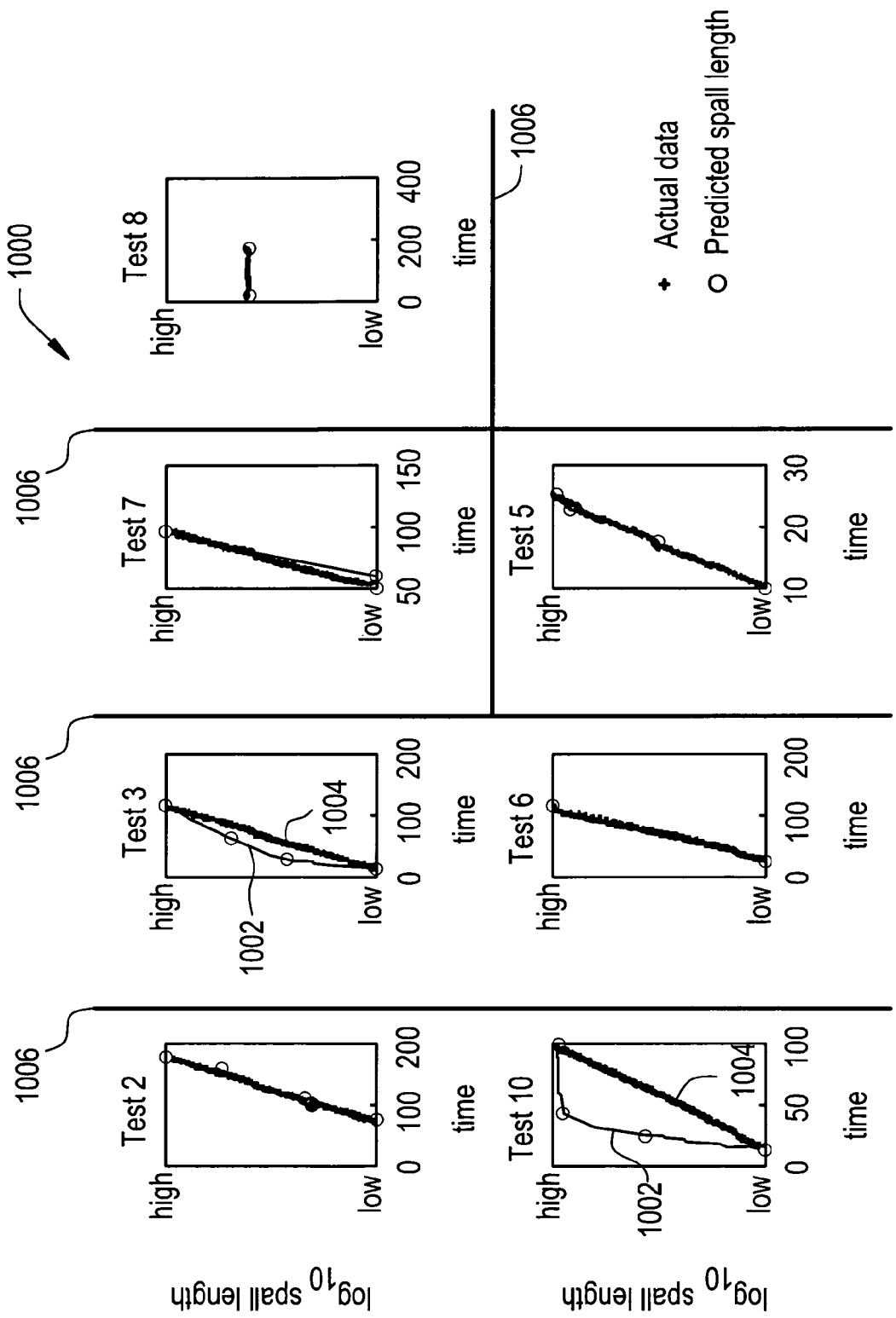
FIG. 10 illustrates a plot of a response of a model to individual test runs in exemplary embodiments.
Figure 11:
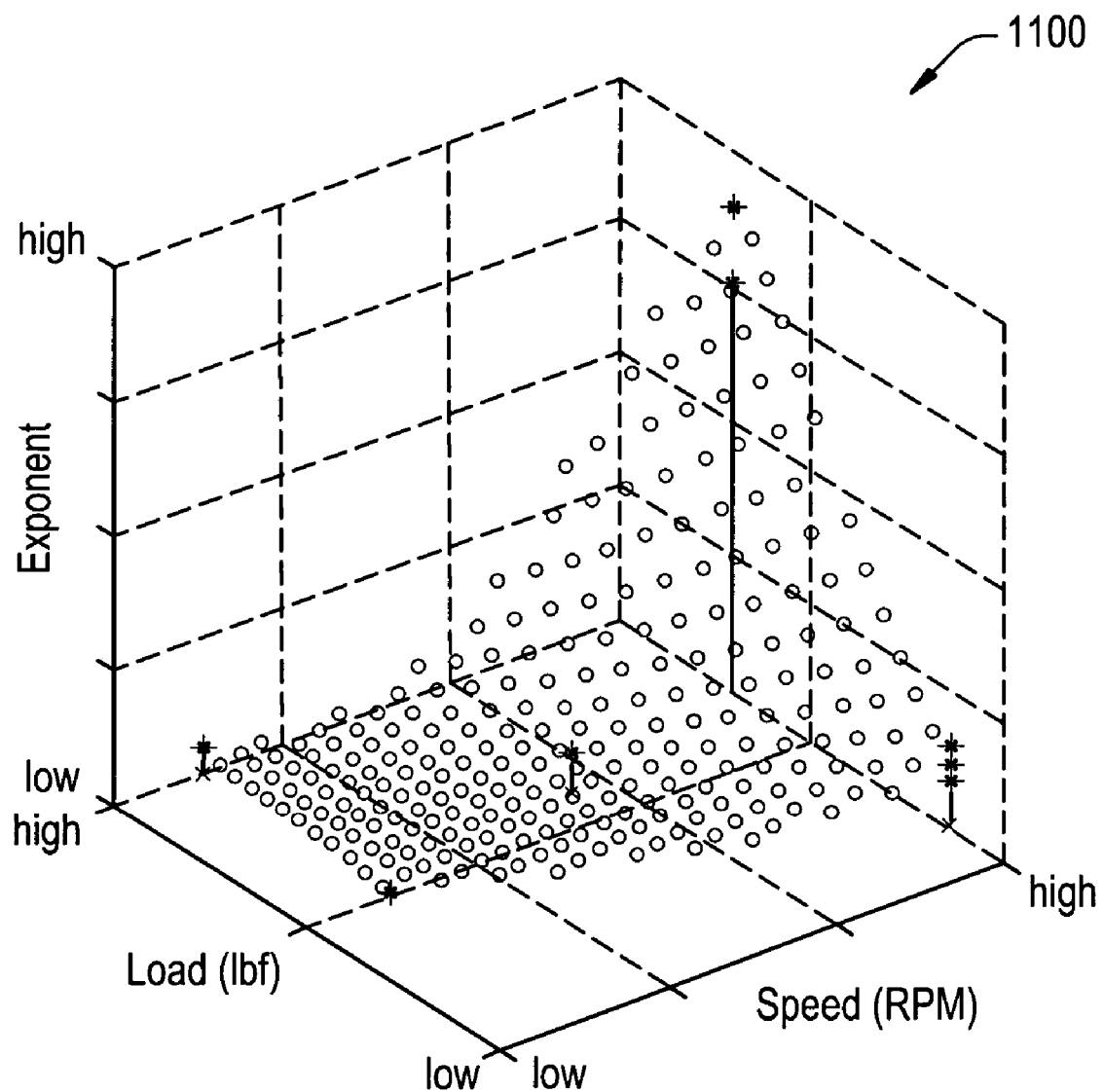
FIG. 11 illustrates a plot of the response surface of the model of FIG. 10, showing data it was modeled from in exemplary embodiments.
Figure 12:
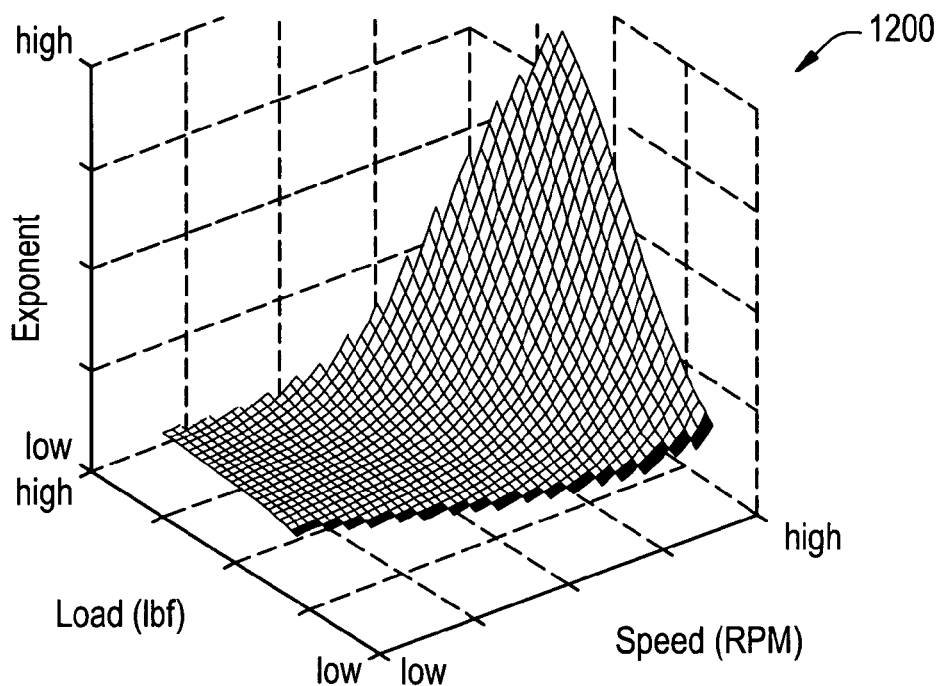
FIG. 12 illustrates a different view of the response surface of the model depicted in FIG. 11 in exemplary embodiments.

Spall growth rate is exponential, with rate an empirical function of speed and load. In exemplary embodiments, spall rate is calculated from the raw data, and a surface is fit using a relatively simple (to avoid unwanted distortions in the surface) neural network (two input nodes, two hyperbolic tangent hidden nodes, and one linear output node). As shown in FIG. 10, a plot 1000 of the response of the model to individual test runs is provided. The response indicates actual data 1002, model-predicted spall length 1004, and lines 1006 separate tests with different conditions. FIG. 11 illustrates a plot 1100 of the response surface of the model showing the data it was modeled from, and FIG. 12 illustrates another view of the response surface 1200.

Referring back to FIG. 4, the physics-based model 408 will now be described in further detail. The physics-based model 408 for the initiation and propagation of bearing fatigue spall uses historic and estimated future operating conditions to determine future bearing condition and returns a probability density function of the bearing remaining useful life. This model is based on first principles approaches such as damage mechanics to track material microstructure changes and eventual loss during the spall propagation phase. It takes into account elements such as material properties, bearing geometry, surface interaction, lubrication, and variable operating conditions.

The physics-based model includes an error correction element (416) to the model at the time of prognostics. Due to the open-loop calculation of the PB model 408, the damage estimate at the time of prognostics may have an offset compared to the best damage of the reasoner. This may lead to a propagation of that bias throughout the prognostic horizon. To counteract that, the reasoner 400 subtracts the bias of the physics-based mean estimate at the time of prognostics from the reasoner-based mean estimate at the time of prognostics.

A primary goal of the prognostic reasoner 400 is to negotiate the different damage estimates and to decide whether another set of mission parameters needs to be executed for another damage estimate further in the future. A key to the reasoner's performance is the ability to aggregate different measures of uncertainty.

To properly aggregate multiple estimates of spall size, it is necessary to account for both model uncertainty and model quality assessment, as discussed above, and to accommodate model updates at arbitrary (possibly different or asynchronous) updating intervals.

In exemplary embodiments, all spall length estimates are put on a common time scale using interpolation, which accommodates different or asynchronous model updating times. Each estimate probability density function (PDF) is then discretized at each time interval over a finely divided (e.g., 1000 intervals) universe of discourse (at most 0% to 100% of race length, but often much less, depending on the maximum non-zero values of all spall length estimate PDFs). The discretized PDF of each estimate is discounted by its unique time-dependent quality assessment values.

$$discounted\_pdf_t = qa_t * pdf_t$$

The discounted PDFs are aggregated using, e.g., kernel regression (i.e., discounting events distant in time from the time currently being evaluated) using:

$$pdf_{aggregated} = \frac{\sum_{i=1}^{N} K_\lambda(t_0, t_i) \cdot discounted\_pdf_i}{\sum_{i=1}^{N} K_\lambda(t_0, t_i)}$$

where $$K_\lambda = \begin{cases} \left(1 - \frac{|t_i - t_0|}{\lambda}\right)^2 & \text{for } \frac{|t_i - t_0|}{\lambda} < 1 \\ 0 & \text{otherwise} \end{cases}$$

Finally, the aggregate PDF is renormalized at each time interval, and the desired spall length percentiles are returned. This concept is illustrated further in FIG. 13.

Figures 13A, 13B:
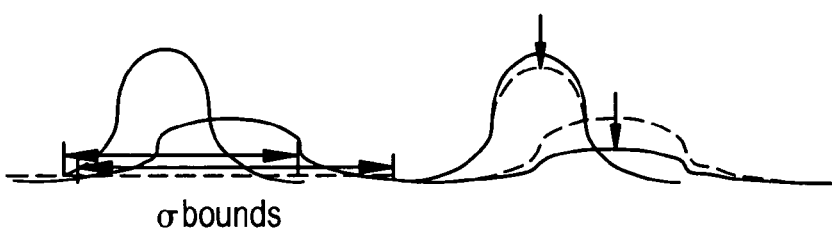
FIG. 13A is a graphical depiction of raw probably density functions (PDFs) in exemplary embodiments.
FIG. 13B is a graphical depiction of the raw PDFs of FIG. 13A scaled by individual quality estimates in exemplary embodiments.
Figures 13C, 13D:
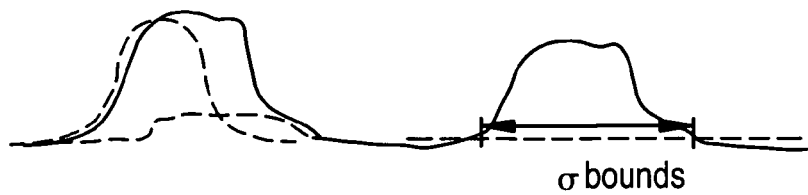
FIG. 13C is a graphical depiction of the PDFs of FIG. 13B combined using kernel regression in exemplary embodiments.
FIG. 13D is a graphical depiction of the PDFs of FIG. 13C normalized in exemplary embodiments.
Figure 14:
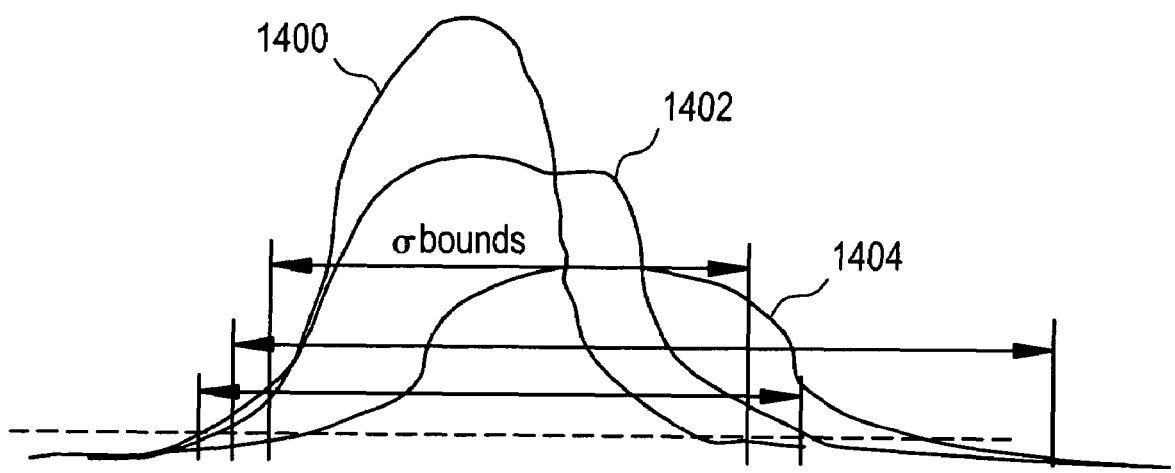
FIG. 14 is a graphical depiction of a spread of original PDFs and aggregated PDF in exemplary embodiments.

First, the raw probability density functions shown in (FIG. 13A) are scaled by the individual quality estimates (FIG. 13B). Next, the PDFs are combined using kernel regression, e.g., kernel filter, (FIG. 13C) and normalized (FIG. 13D). The resulting spread of the fused PDF is smaller than the original ones at the same level of risk (say, 3 σ) as illustrated in FIG. 14.

The post-processing portion of the integrated prognosis system will now be described in further detail. Some output of the damage estimate transfer functions can be noisy. That in turn may result in suboptimal behavior in the fusion function. Specifically, it is undesirable to have non-monotonic behavior. To reduce noise and encourage monotonic properties, an adaptive filter is employed that is responsive to increases while being more cautious to downward changes of the input. Specifically, an exponential weighted moving average filter is employed where weight α was modified based on the situation at hand. The governing equation is:

$$damage_{debris}(k) = \alpha \cdot damge_{debris_{filtered}}(k-1) + (1-\alpha) \cdot damage_{debris}(k)$$

$$\alpha = \begin{cases} \max(bound_{lower}, \alpha \cdot scaler_{decay}) \\ \quad \text{if } damage_{debris_{filtered}}(k-1) \leq damge_{debris}(k) \\ \min(bound_{upper}, \alpha \cdot scaler_{increase}) \quad \text{otherwise} \end{cases}$$

Typical values for the threshold and fixed quantities are:
bound$_{lower}$=0.1
bound$_{upper}$=0.99
scaler$_{decay}$=0.99
scaler$_{increase}$=1.02

As described above, two fundamentally different methods are aggregated to more reliably estimate remaining life and how their independent estimates can be fused. One method uses first principles to model fault propagation through consideration of the physics of the system. The other method is an empirical model using data from experiments at known conditions and component damage level to estimate condition-based fault propagation rate. These two approaches are fused in the prognostic mode to produce a result that is more accurate and more robust than either method alone. The fusion method employs a combination of damage PDFs, subjective quality assessments, and a kernel-based regression through time. The diagnostic reasoner uses the same fusion method but adds a debris-based damage estimate and a vibration-based damage estimate to the estimation suite. The diagnostic reasoner also detects spalls based on a combination of debris and vibration features.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, punch cards, laser disc, or any other computer-readable storage medium, wherein, when the computer program code is loaded into and executed by a computer, the computer becomes an apparatus for practicing the embodiments. The exemplary embodiments can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or or transmitted via electromagnetic radiation, wherein, when the computer program code is loaded into an executed by a computer, the computer becomes an apparatus for practicing the embodiments. When implemented on a microprocessor, the computer program code segments configure the microprocessor to create specific logic circuits. Alternatively, some aspects may be directly implemented in hardware. The technical effect of the executable code is to facilitate diagnostics and prognostics for system components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing an integrated prognosis system, comprising:

calculating an accumulated damage estimate for a component via a diagnostics function;

applying future mission information for the component to at least one model that calculates accumulated damage or remaining life, wherein mission information comprises one or more of a power level angle, a mach number and an altitude and wherein the at least one model is tuned using sensor data from a rig test;

inputting the accumulated damage estimate to the at least one model;

assembling data sequences representing only active operation of the rig via a time-mapping function;

removing data resets and negative trending outliers; and synchronizing specified sensor features to a common, uniformly sampled time vector;

aggregating damage over time and quality assessments produced by the at least one model;

calculating a damage propagation profile and remaining life estimate for the component based upon the aggregating; and providing an uncertainty estimate for the damage estimate and the remaining life estimate to a user.

2. The method of claim 1, wherein the at least one model includes one of:

a physics-based model; and an experience-based model.

3. The method of claim 2, wherein the experience-based model is based on using observations from experiments to determine damage propagation for specific operational set points to build a nonlinear general map that allows retrieval of the damage propagation for any operational condition.

4. The method of claim 1, wherein the quality assessments are computed based on at least one of:

a priori performance of the at least one model as a function of operational conditions of the component, the operational conditions comprising at least one of load and speed;

variability of the at least one model during operation;

time elapsed since the at least one model has received a damage estimate update; and data sources.

5. The method of claim 4, wherein sources of sensor data include debris data, wherein the computation of the quality assessments represents a function of the variability over a previous number of readings, bounded between two limiting values comprising a lower confidence bound and an upper confidence bound when damage is below a specified threshold, and the quality assessments are gated to a fixed value when the damage is above the specified threshold.

6. A method for implementing an integrated prognosis system, comprising:

calculating an accumulated damage estimate for a component via a diagnostics function;

applying future mission information for the component to at least one model that calculates accumulated damage or remaining life, wherein mission information comprises one or more of a power level angle, a mach number and an altitude;

inputting the accumulated damage estimate to the at least one model;

aggregating damage over time and quality assessments produced by the at least one model, such aggregating including aggregating measures of uncertainty, comprising:

calculating at least one probability density function for remaining useful life of the component;

discretizing the at least one probability density function at specified time intervals over a divided universe of discourse;

discounting the discretized probability density function by its time-dependent quality assessment values;

aggregating discounted probability density functions; and normalizing the aggregated discounted probability density functions at each of the specified time intervals;

calculating a damage propagation profile and remaining life estimate for the component based upon the aggregating; and providing an uncertainty estimate for the damage estimate and the remaining life estimate to a user.

7. The method of claim 6, wherein a kernel filter is applied to the aggregated discounted probability functions, discounting the aggregated discounted probability density functions in the past more than recent aggregated discounted probability density functions.

8. The method of claim 6, further comprising:

applying an adaptive filter to results of the normalizing operable for reducing non-monotonic behaviors for damage estimate outputs resulting from the at least one probability density function.

9. The method of claim 6, wherein the at least one model includes an experience-based model that is based on using observations from experiments to determine damage propagation for specific operational set points to build a nonlinear general map that allows retrieval of the damage propagation for any operational condition.

10. The method of claim 6, wherein the quality assessments are computed based on at least one of:

a priori performance of the at least one model as a function of operational conditions of the component, the operational conditions comprising at least one of load and speed;

variability of the at least one model during operation;

time elapsed since the at least one model has received a damage estimate update; and data sources.

11. A computer program product for implementing an integrated prognosis system, the computer program product including a computer readable medium having instructions for executing a method, the method comprising:

calculating an accumulated damage estimate for a component via a diagnostics function;

applying future mission information for the component to at least one model that calculates accumulated damage or remaining life, wherein mission information comprises one or more of a power level angle, a mach number and an altitude and wherein the at least one model is tuned using sensor data from a rig test;

inputting the accumulated damage estimate to the at least one model;

assembling data sequences representing only active operation of the rig via a time-mapping function;

removing data resets and negative trending outliers; and synchronizing specified sensor features to a common, uniformly sampled time vector;

aggregating damage over time and quality assessments produced by the at least one model;

calculating a damage propagation profile and remaining life estimate for the component based upon the aggregating; and providing an uncertainty estimate for the damage estimate and the remaining life estimate to a user.

12. The computer program product of claim 11, wherein the at least one model includes one of:

a physics-based model; and an experience-based model.

13. The computer program product of claim 12, wherein the experience-based model is based on using observations from experiments to determine damage propagation for specific operational set points to build a nonlinear general map that allows retrieval of the damage propagation for any operational condition.

14. The computer program product of claim 11, wherein the quality assessments are computed based on at least one of:

a priori performance of the at least one model as a function of operational conditions of the component, the operational conditions comprising at least one of load and speed;

variability of the at least one model during operation;

time elapsed since the at least one model has received a damage estimate update; and data sources.

15. The computer program product of claim 14, wherein sources of sensor data include debris data, wherein the computation of the quality assessments represents a function of the variability over a previous number of readings, bounded between two limiting values comprising a lower confidence bound and an upper confidence bound when damage is below a specified threshold, and the quality assessments are gated to a fixed value when the damage is above the specified threshold.

16. A computer program product for implementing an integrated prognosis system, the computer program product including a computer readable medium having instructions for executing a method, the method comprising:

calculating an accumulated damage estimate for a component via a diagnostics function;

applying future mission information for the component to at least one model that calculates accumulated damage or remaining life, wherein mission information comprises one or more of a power level angle, a mach number and an altitude;

inputting the accumulated damage estimate to the at least one model;

aggregating damage over time and quality assessments produced by the at least one model, such aggregating including aggregating measures of uncertainty, comprising:

calculating at least one probability density function for remaining useful life of the component;

discretizing the at least one probability density function at specified time intervals over a divided universe of discourse;

discounting the discretized probability density function by its time-dependent quality assessment values;

aggregating discounted probability density functions; and normalizing the aggregated discounted probability density functions at each of the specified time intervals;

calculating a damage propagation profile and remaining life estimate for the component based upon the aggregating; and providing an uncertainty estimate for the damage estimate and the remaining life estimate to a user.

17. The computer program product of claim 16, wherein a kernel filter is applied to the aggregated discounted probability functions, discounting the aggregated discounted probability density functions in the past more than recent aggregated discounted probability density functions.

18. The computer program product of claim 16, further comprising instructions for performing:

applying an adaptive filter to results of the normalizing operable for reducing non-monotonic behaviors for damage estimate outputs resulting from the at least one probability density function.

19. The computer program product of claim 16, wherein the at least one model includes an experience-based model that is based on using observations from experiments to determine damage propagation for specific operational set points to build a nonlinear general map that allows retrieval of the damage propagation for any operational condition.

20. The method of claim 16, wherein the quality assessments are computed based on at least one of:

a priori performance of the at least one model as a function of operational conditions of the component, the operational conditions comprising at least one of load and speed;

variability of the at least one model during operation;

time elapsed since the at least one model has received a damage estimate update; and data sources.

* * * * *